Nov. 20, 1923.

E. SCHNEIDER

ENDLESS TRACK MOTOR CAR

Filed Feb. 28, 1920     5 Sheets-Sheet 1

1,474,918

Nov. 20, 1923.

E. SCHNEIDER

ENDLESS TRACK MOTOR CAR

Filed Feb. 28, 1920

Inventor:-
Eugene Schneider
By Mauro, Cameron, Lewis & Kirkam
Attorneys.

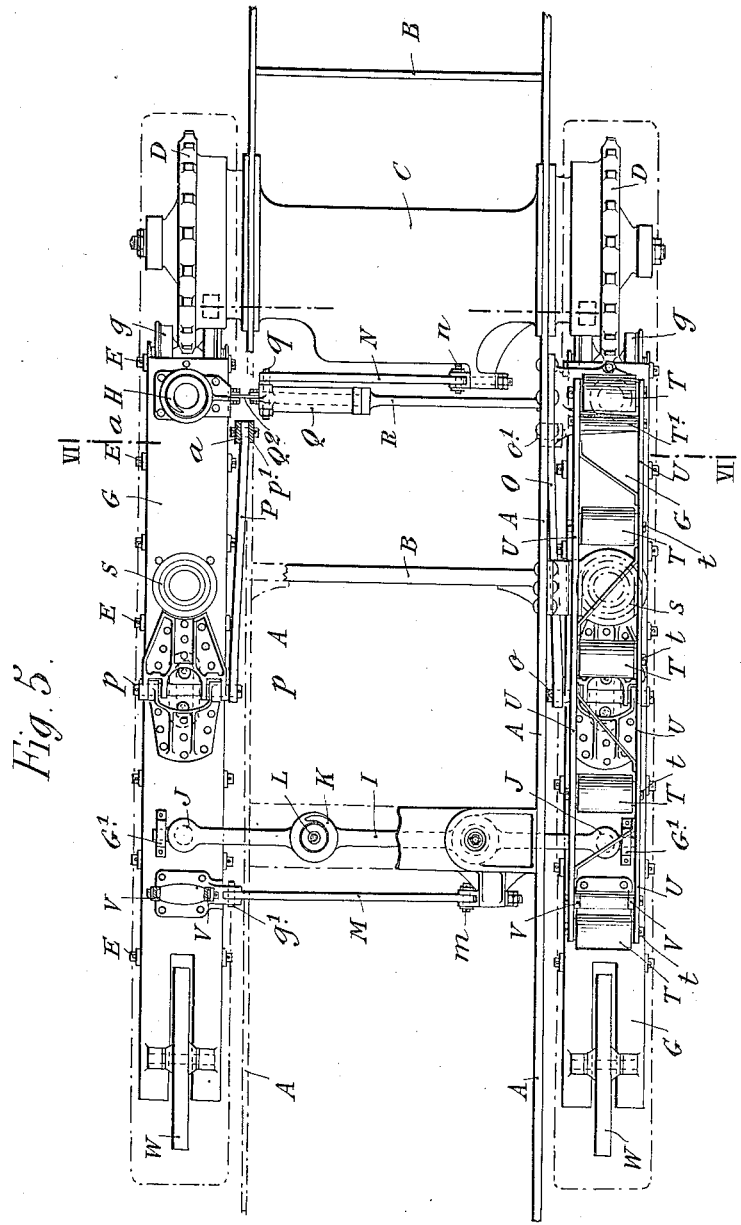

Patented Nov. 20, 1923.

1,474,918

UNITED STATES PATENT OFFICE.

EUGÈNE SCHNEIDER, OF PARIS, FRANCE, ASSIGNOR TO SCHNEIDER & CIE., OF PARIS, FRANCE, A JOINT STOCK COMPANY OF FRANCE.

ENDLESS-TRACK MOTOR CAR.

Application filed February 28, 1920. Serial No. 362,112.

(GRANTED UNDER THE PROVISIONS OF THE ACT OF MARCH 3, 1921, 41 STAT. L., 1313.)

*To all whom it may concern:*

Be it known that I, EUGÈNE SCHNEIDER, of Paris, France, have invented new and useful Improvements in Endless-Track Motor Cars (for which I have filed applications in France, May 25, 1916; Great Britain, No. 125641, Sept. 28, 1916; Italy, March 26, 1917), which invention is fully set forth in the following specification.

This invention has for its object to provide an improved construction of motor vehicle of the endless track type, that is to say, in which the vehicle rests by means of wheeled trucks, upon two endless jointed tracks.

These improvements are partly designed for that kind of endless track vehicle, which comprises for each endless track, a toothed driving wheel, journalled in the rear part of the vehicle framing, and engaging in the usual manner with the joint pins between the elements of the corresponding endless track.

The more particular object of this invention is to give to the support of the vehicle upon its trucks, a greater suppleness than is afforded by the constructional means hitherto known, so that the trucks and the endless tracks as a whole may be enabled to follow more closely the inequalities of rough ground, without interfering with the stability of the vehicle framing.

These results are obtained by the peculiar means of suspension of the vehicle framing upon the wheel trucks, as well as by special means of transverse connection of the trucks to each other, and of the trucks to the vehicle framing.

The manner in which this invention is to be performed will now be more particularly described with reference to the accompanying drawings, which illustrate, by way of example, various practical forms of construction and application of this invention.

In these drawings:

Fig. 1 is a side elevation.

Fig. 3 is a cross section on the line III—III of Fig. 1, the upper stretch of the endless track having been removed.

Figs. 4, 5 and 6 are respectively an elevation, a plan and a section on the line VI—VI of Figs. 4 and 5, showing the invention applied to a vehicle wherein the endless track are each provided with two supporting trucks coupled together.

Figure 1:
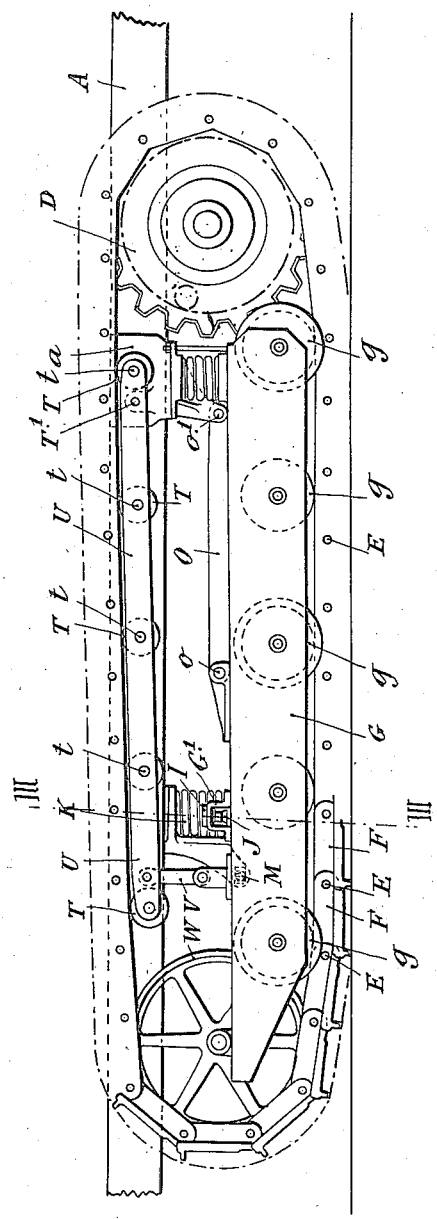
Figs. 1 and 3 show the invention applied to an endless track vehicle having a single truck for each track.
Figure 6:
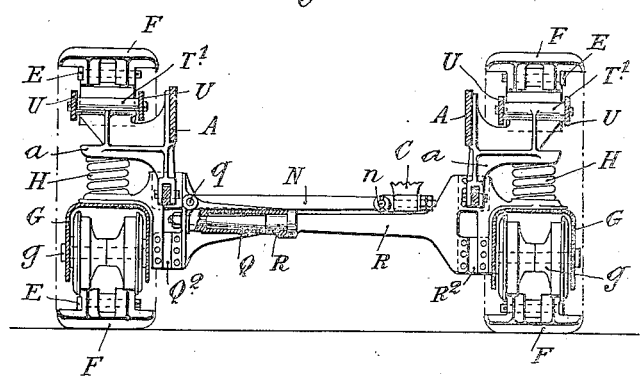

The vehicle framing, which may be of any suitable constructions, comprises, in the example shown, two longitudinals A connected at several points by cross ties B. The entire structure is fixed to a gear box C serving to drive the two toothed wheels D which propel the vehicle in the usual manner by engaging with the stay pins E of the links F of the jointed endless track. Upon these endless tracks there are supported by means of their rollers $g$, the trucks G consisting of one body (Figs. 1 to 3) or of two bodies jointed to each other (Figs. 4 to 6).

According to the invention, the suspension is effected with the object of allowing the rear portions of the trucks G close to the driving wheels D, to make only slight movements relatively to the vehicle framing, whilst the forward portions of the said trucks are allowed great freedom of movement in its longitudinal axial plane.

The former result is achieved by arranging two rear springs H of small flexibility, located respectively in the longitudinal axial plane of the right and left hand trucks, directly between a lateral projection of the vehicle framing and the truck G; these rear springs situated flush with the trucks are combined with an indirect forward bearing. This bearing is constituted by two springs K located nearer to the longitudinal axis of the vehicle, and situated between the vehicle framing and an intermediate rocking cross beam I which rests upon the trucks by means of spherical bearings, the springs K thus providing a resilient universal connection between the main frame and the cross-beam. In the example shown, the spherical bearings J are fixed to the trucks G, and they fit in recesses or spherical steps formed in the rocking cross beam I, thereby forming ball and socket joints between the ends of the cross-beam and the trucks.

It will be easily perceived that the trucks G are able to execute considerable relative angular movements, appreciably about horizontal axes situated in the common transverse axial plane of the two rear springs H.

Figure 3:
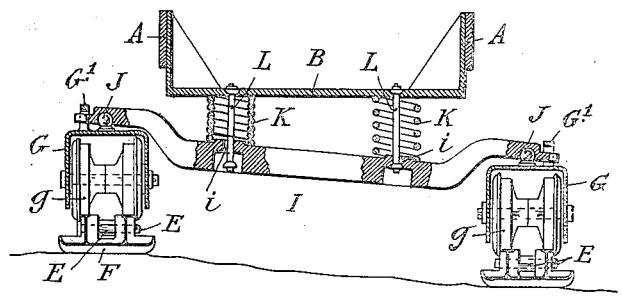
Figure 4:
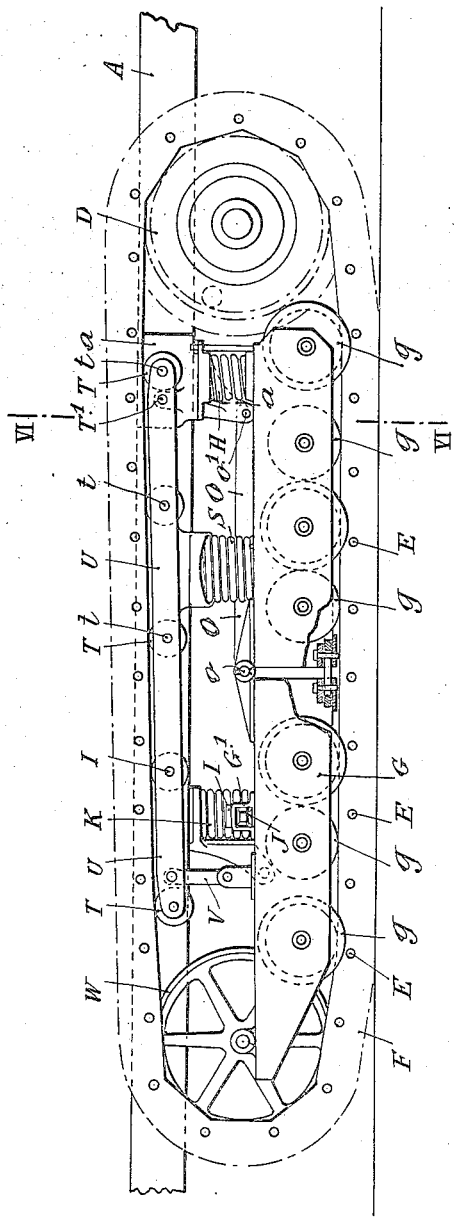

Fig. 3 shows how, without interfering with the stability of the vehicle framing, the trucks are able to execute these relative movements, whilst the endless tracks follow closely the longitudinal ups-and-downs of ground comprising likewise, great difference of level in the transverse direction.

The rocking cross beam I serves, at the same time, to maintain the distance between the trucks. In these circumstances, in order to provide, at the front, a transverse connection between the two trucks and the vehicle framing, only one connecting rod M is required, which connects at $q^1$ one of the trucks G (that one which is in the upper part of the plan, Figs. 2 and 5) to a fixed point situated at $m$ at the opposite side of the vehicle framing.

Rods L fixed on the under-side of the vehicle framing (Fig. 3), extending with a suitable amount of "play" in guides $i$ formed in the rocking beam I, allow, by reason of their lower heads striking said guides, of limiting the amount of movement between the rocking beam and the vehicle framing. All accidental disengagement between the spherical bearings J and the rocking beam may be prevented by means of straps $G^1$ fixed on the trucks G.

The rear transverse connection of the trucks one to the other, and of the trucks to the vehicle framing is preferably effected as follows:

A jointed cross stay composed of two elements Q, R slipped one over the other, is attached by means of one of its elements Q to one of the trucks, and by means of the other element R to the other truck. The journalling of the element Q upon the element R allows a certain relative angular displacement of the trucks in their respective longitudinal axial planes. A transverse connecting rod N connects the element Q at $q$ to a point $n$ of the vehicle framing (Figs. 2 and 5).

Figure 2:
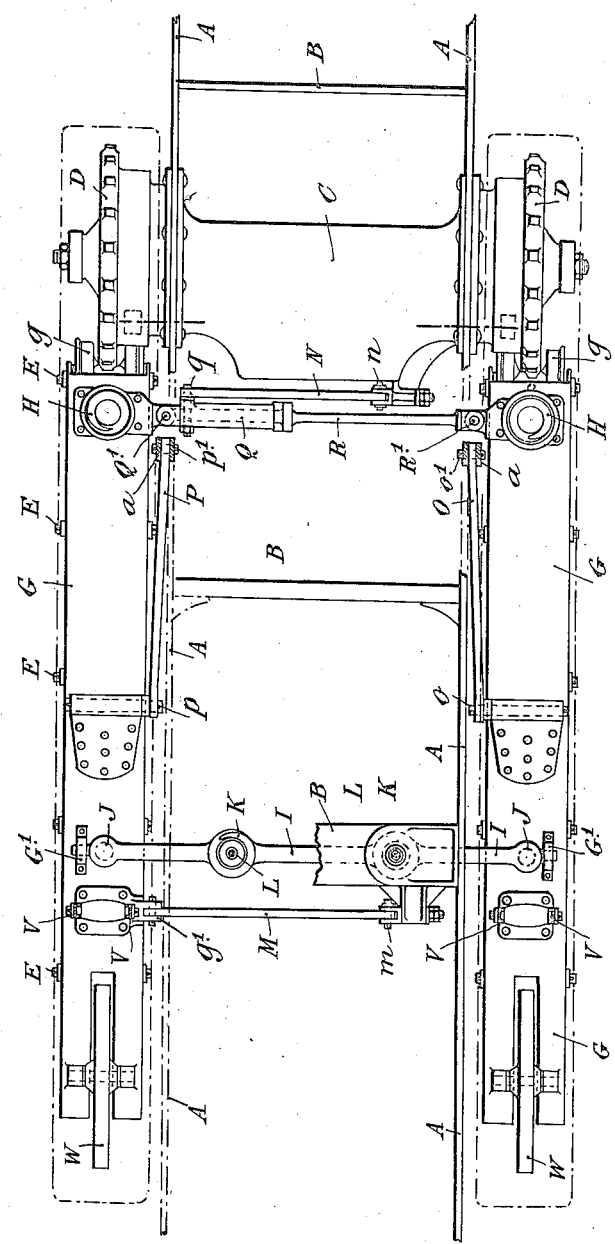
Fig. 2 is a plan, the endless tracks proper having been removed.

In order that the angles enclosed between the stay Q—R and the trucks shall be capable of slight deformation, the elements Q—R may, as indicated in Fig. 2, be connected to the corresponding truck by means of a vertical joint ($Q^1$, $R^1$ respectively).

Further, in view of the fact that the angular deformations to be provided for are very slight, the vertical joint may be replaced by intermediate flexible plates attached respectively to the truck and the head of the corresponding stay element, as indicated at $Q^2$ in Fig. 5, and at $Q^2$, $R^2$ in Fig. 6.

The connection between the trucks and the vehicle framing is completed by two longitudinal connecting rods O, P which are jointed respectively at $o$, $p$, to the corresponding truck, and at $o^1$, $p^1$ to the vehicle framing.

In the example shown in Figs. 4 and 6, the invention is shown applied to a vehicle in which the endless tracks are each provided with two trucks jointed together. In this case, the whole of the front truck and the front portion of the rear truck must have a certain amount of vertical mobility with relation to the rear portion of the rear truck. It will then be preferable to complete the suspension by adding a very flexible spring S to the front portion of each rear section for instance, each of these springs may be composed of three concentric coiled springs.

The rollers T are (as shown in elevation in Figs. 1 and 4, and in plan in Fig. 5) carried by an arm U—U consisting preferably of two side plates U suitably stayed together, and carrying the axles $t$ of the rollers. This arm is jointed at the rear at $T^1$ to a fixed point of the vehicle framing; at its other end it is jointed by means of a small connecting rod V to a point of the corresponding truck situated as far forward as possible. By means of this construction, the top stretch of the endless track is kept straight and practically tangential at the rear to the driving wheel D, and at the front to the guide wheel W, irrespectively of the relative movements between the trucks and the vehicle framing.

What I claim is:

1. In an endless track vehicle, the combination of a main frame, trucks within the endless tracks and supporting said main frame, a cross-beam having ball and socket connections at its ends, with said trucks, and a universal connection for said cross-beam with said main frame including a resilient element interposed therebetween.

2. In an endless track vehicle, the combination of a main frame, trucks within the endless tracks and supporting said main frame, a cross stay connected with one end of each truck, a rod connecting the opposite end of one truck with a relatively opposite side of said main frame, and a cross-beam universally connected at its ends with said trucks.

3. In an endless track vehicle, the combination of a main frame, trucks within the endless tracks and supporting said main frame, connections between the main frame and trucks providing for independent rocking movement of the latter in vertical planes, a cross-beam having universal connection at its ends with said trucks, and a resilient universal connection between said cross-beam and the main frame.

4. In an endless track vehicle, the combination of a main frame, trucks within the endless tracks and supporting said main frame, connections between the main frame and trucks providing for independent rocking movement of the latter in vertical planes, a cross-beam having universal connection at its ends with said trucks, and a resilient universal connection between said cross-beam and the main frame comprising a spring interposed therebetween and a rod headed at its ends and extending loosely through the main frame, spring and cross-beam.

5. In an endless track vehicle, the combination of a main frame, trucks within the endless tracks and supporting said main frame, pivotal connections between the main frame and trucks providing for independent rocking movement of the latter in vertical planes, a cross-beam having universal connection at its ends with said trucks, and resilient universal connections between said cross-beam and main frame, each connection comprising a spring interposed between the main frame and cross-beam near each end of the latter, and a rod headed at its ends and extending loosely through said frame, spring and cross-beam.

6. In an endless track vehicle, the combination of a main frame, trucks within the endless tracks and on which said main frame is supported, a cross-beam having ball and socket connections at its ends with said trucks and resilient universal connections between the main frame and said cross-beam disposed near the ends of the latter.

7. In an endless track vehicle, the combination of a main frame, trucks in the endless tracks and on which the main frame is supported, a cross-beam having universal connections at its ends with said trucks, and loose resilient means connecting the main frame with the cross-beam and providing for universal movement of the latter about its ends.

8. In an endless track vehicle, the combination of a main frame, trucks within the endless tracks, a rocking beam disposed transversely with respect to said main frame and forming a load support, said rocking beam having universal connection at its ends with said trucks, and resilient universal connections for the rocking beam with the main frame each comprising a spring interposed between said frame and rocking beam at one side of a medial fore and aft line thereof and a rod extending through said main frame, spring and cross-beam.

9. In an endless track vehicle, the combination of a main frame, trucks within the endless tracks and on which said frame is supported, a cross stay, and flexible plates connecting said cross stay with said trucks.

10. In an endless track vehicle, the combination of a main frame, trucks at each side of the main frame and arranged within the endless tracks, rear springs of slight flexibility in the longitudinal axis of the trucks and providing supports for said main frame, a rocking-beam connected at its ends with said trucks by universal joints, front springs interposed between the rocking-beam and main frame near the longitudinal axis of the latter, and rods headed at their ends and extending loosely through said main frame, front springs and rocking-beam.

11. In an endless track vehicle, the combination of a pair of trucks each arranged within one endless track, a main frame supported on said trucks, a telescopic cross-connection between said trucks, the elements of said connection having relative movement about their common longitudinal axis and each of said elements being flexibly connected to one of said trucks, and a connecting rod between one of said elements and the main frame.

12. In an endless track vehicle, the combination of a main frame, trucks within the endless tracks and supporting said main frame, a cross-beam pivoted at its ends to the front ends of the trucks and having a rocking connection with the main frame, a cross-beam connecting the rear ends of said trucks, a transverse rod connecting the front end of one truck with the main frame, and a second transverse rod connecting the rear cross-beam with said frame.

13. In an endless track vehicle, the combination of a main frame, trucks within the endless tracks and supporting said main frame, a cross stay connecting the rear ends of said trucks and comprising coupled complementary elements rotatable relatively to each other, a cross-beam pivotally connected at its ends with the front ends of said trucks, a transverse rod adjacent to the cross-stay and a transverse rod adjacent to the cross-beam, each of said rods at its opposite ends being pivotally connected with one of the trucks and the main frame.

In testimony whereof I have signed this specification.

EUGÈNE SCHNEIDER.

Witnesses:
 ANDRÉ MOSTICKER,
 LOUIS GARDET.